Oct. 29, 1968 R. C. BAXTER 3,407,773
SYSTEMS FOR CONTROLLING THE POSITION OF A FLOATING VESSEL
Filed Nov. 4, 1966 3 Sheets-Sheet 1
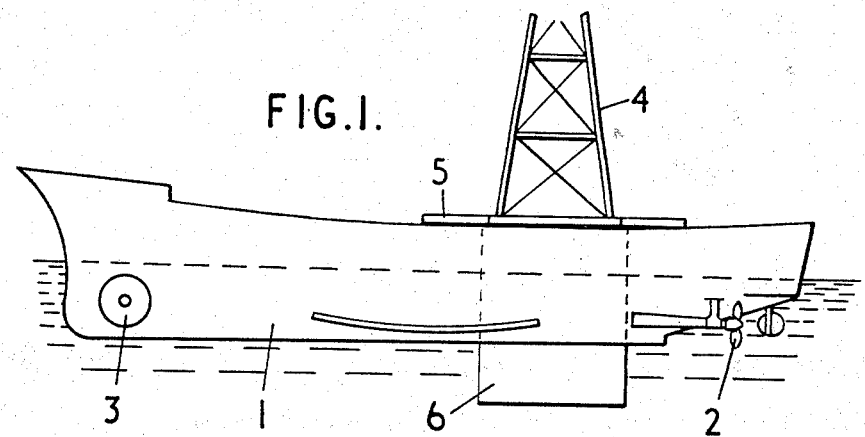
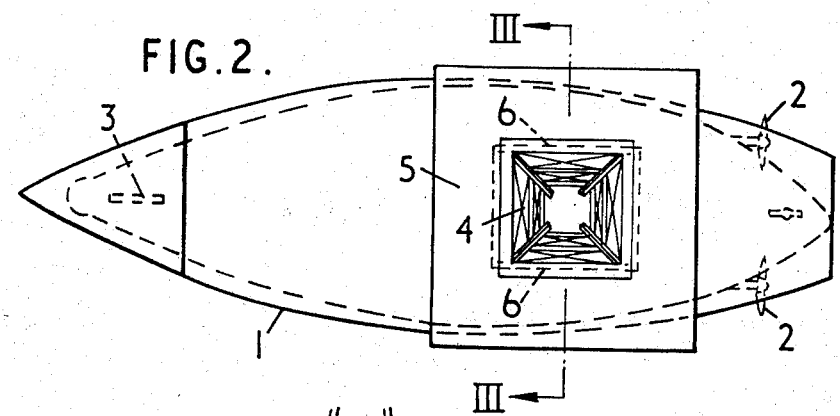
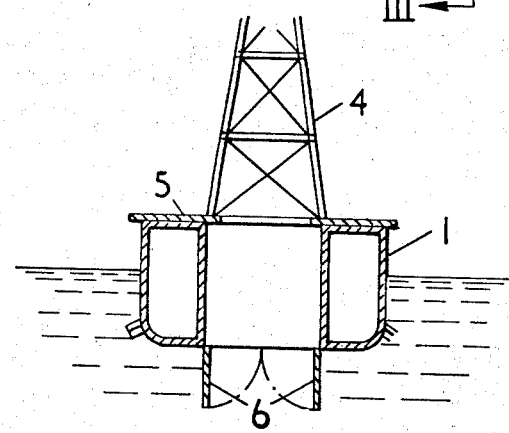

Oct. 29, 1968 R. C. BAXTER 3,407,773
SYSTEMS FOR CONTROLLING THE POSITION OF A FLOATING VESSEL
Filed Nov. 4, 1966 3 Sheets-Sheet 2

United States Patent Office 3,407,773
Patented Oct. 29, 1968

3,407,773
SYSTEMS FOR CONTROLLING THE POSITION
OF A FLOATING VESSEL
Roderick Carey Baxter, April Cottage, 135 Pilgrims Way,
Kemsing, Sevenoaks, Kent, England
Filed Nov. 4, 1966, Ser. No. 592,097
Claims priority, application Great Britain, Nov. 5, 1965,
47,120/65
4 Claims. (Cl. 114—144)

ABSTRACT OF THE DISCLOSURE

A system for controlling a vessel's propulsion to maintain it in a desired position while compensating for the action of wind and currents. The vessel is provided with trap doors to define a "turning point" for the vessel while the system combines the various forces acting on the vessel to provide a single algebraic force and direction.

---

This invention relates to systems for controlling the position of a floating vessel e.g. for the purpose of locating a drilling rig in a fixed geographical position.

Generally this is done by using some form of position determination such as a moored buoy with optical or radar sighting, a taut wire fixed to the bottom of the sea with electrical position signals, or some form of sonar or radio-location technique.

In previous arrangements means have been provided to restore the vessel bodily when it moves from the desired position, e.g. by means of two vertical blade vertical axis propeller units.

When vessels are required to progress sideways or at large angles to their ahead or astern position very large drag figures result so that the methods previously used become ineffective when the weather or tide conditions are adverse since the power required to restore tthe vessel to its reference position becomes greater than the power available.

The present invention consists in a vessel having screw propulsion means, such as a bow thruster, for turning the vessel when at rest or moving at low speeds, and an arrangement for controlling its position, in relation to a reference point of the vessel, comprising means for orientating the vessel to direct it, after due allowance for tide and wind, towards the reference position, and means for controlling the propulsion of the vessel to drive it in the direction in which it is directed, towards the reference position.

Preferably the screw arrangement is twin variable pitch reversible screws so that power can be applied in a graduated manner.

The invention will be further described with reference to the accompanying drawings.

FIGURE 1 is a side elevation of a ship for use according to the invention.

FIGURE 2 is a plan view.

FIGURE 3 is a section on the line III—III of FIGURE 2.

Figure 4:
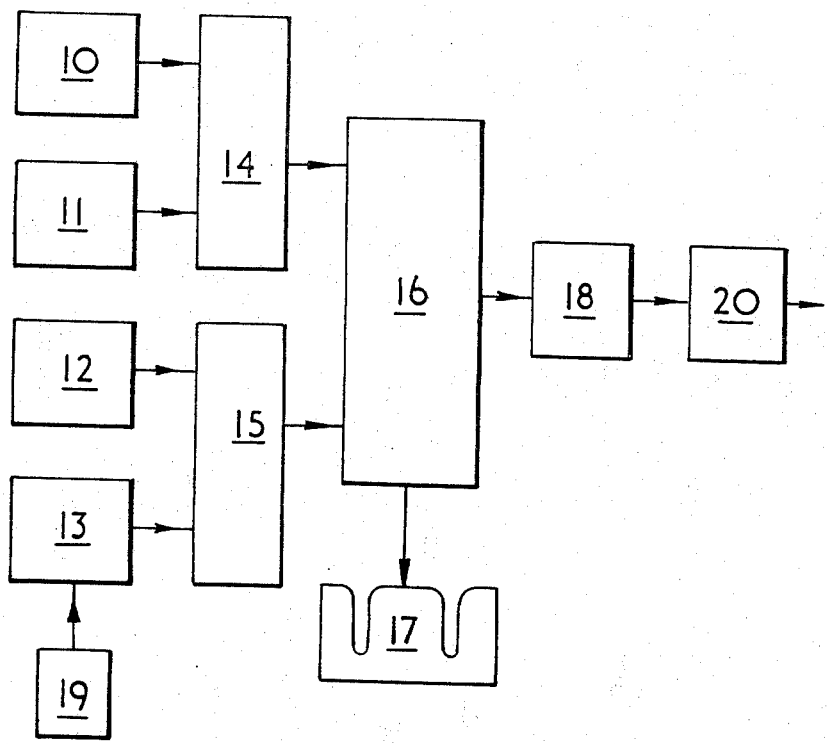
FIGURE 4 is a block diagram of the electrical control arrangement.

In FIGURES 1 to 3 of the drawings, 1 is the hull of a vessel provided with twin screws 2 and a bow thrusting propeller 3.

Mounted in the vessel is the drilling rig 4 on a platform 5.

Trap doors 6 are provided to define the "turning point" of the vessel in the sea as accurately as possible.

The platform 5 is turntable capable of being servo controlled from a gyro compass to return a given selected heading irrespective of the turning of the vessel.

In order that drilling may be continued in adverse weather conditions the vessel would need to be of substantial beam and have generous bilge keels with preferably an active or passive controlled water tank stabiliser of adequate power to reduce rolling.

Pitching generally will not exceed about 7° in a 10,000 ton vessel and this may well be acceptable.

As shown in FIGURE 4 electrical sensers are provided as follows:

Wind: speed—an anemometer 10; direction—a senser 11 mounted in a weathervane;

Sea current: speed—a "Roberts" type current meter 12; direction—a watervane 13.

Each instrument provides a suitable electrical output which can be electricaly resolved into a single algebraic force and direction.

Figure 5:
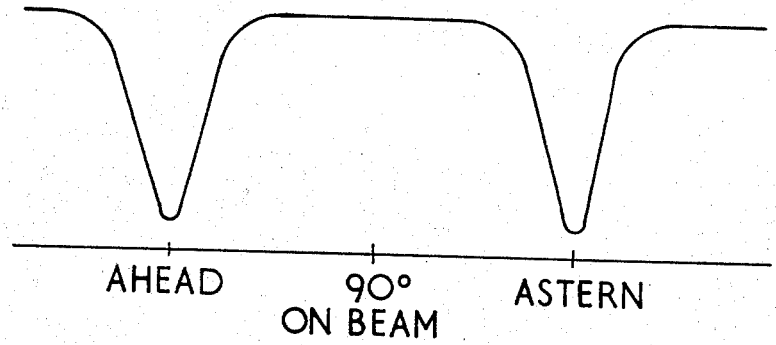
FIGURE 5 is a graph showing the variation of water drag in relation to the ship's heading.

The signals from sensers 10 and 11 are algebraically combined in a unit 14 and the signals from sensers 12 and 13 are combined in a unit 15 and the outputs from units 14 and 15 are then combined in unit 16 in which they are applied to a shaped cam 17 representing the ship's resistance at varying headings derived from the curve shown in FIGURE 5.

The output at 18 is combined with the directional component 19 of the taut wire or like device and gives the selected heading to direct the vessel towards the reference point and after amplification at 20 this is applied as a signal to the bow thruster 3 to keep the vessel pointing in the correct direction so that any horizontal displacement error from the taut wire or the like 21 may be fed into a central control position which extends control to the twin screws to be turned at the same r.p.m. to drive the vessel ahead or astern as required to restore its position.

The amount of power applied to the bow thruster and screws would be scaled against the magnitude of the error present.

Figure 6:
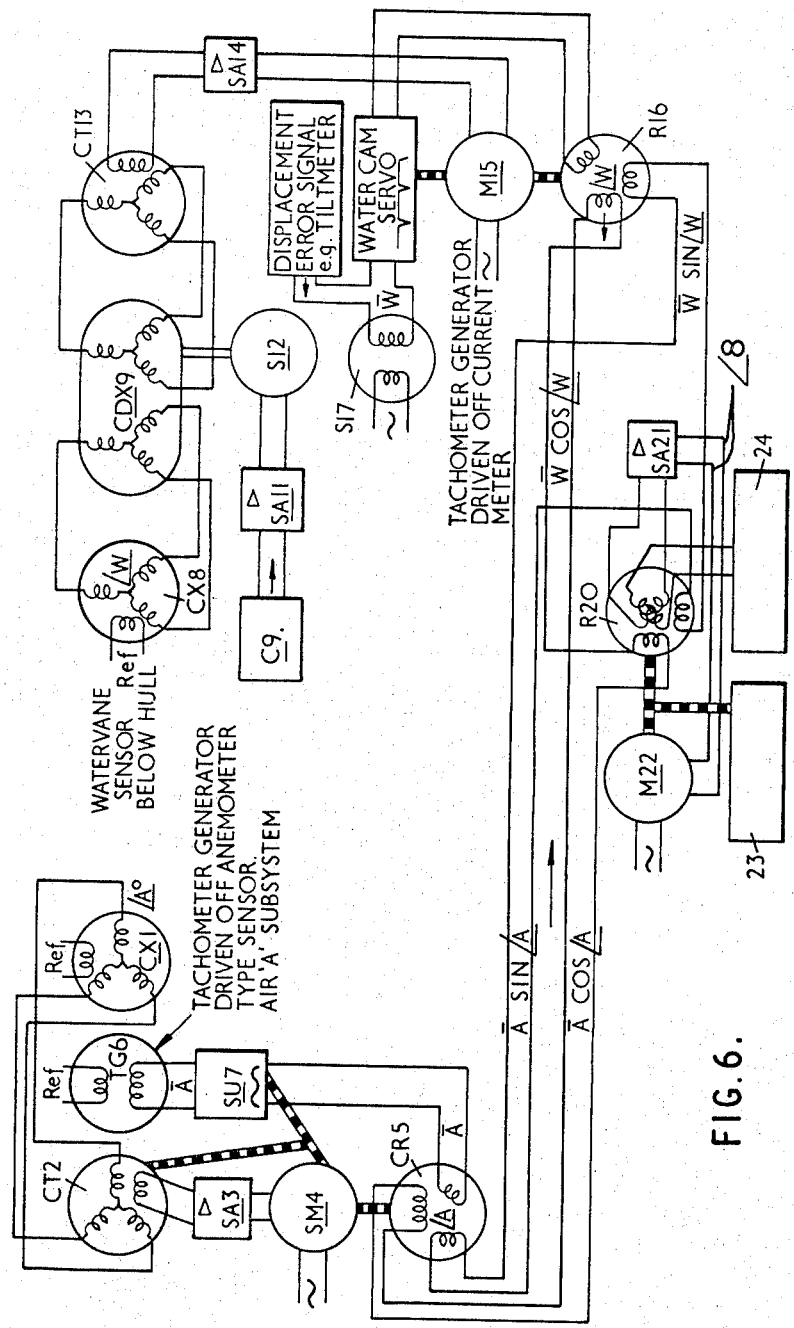
FIGURE 6 is a more detailed circuit diagram.

Referring to FIGURE 6:

Signals corresponding to wind and water movement are processed by air or water cam servos and vectorally added to produce two control signals for application to the bow thruster and propulsion unit. One signal corresponds to a "angular heading demand" $\angle 8$ and the other is a "Fore and aft thrust" demand proportional to "$r$" the radius error or displacement from the chosen position.

Signals are obtained as follows:

A weathervane suitably damped against oscillation is mechanically coupled to a synchro CX1. The electrical signal thereby generated is fed to a synchro CT2. The CT forms part of a unit comprising servo amplifier SA3, servomotor with gearbox SM4 and coupled sine-cosine resolver CR5.

One rotor winding of the resolver is fed with a processed wind velocity signal derived from the tachometer generator item TG6 and air cam servo unit SU7. (The cam having been made to simulate accurately the effect of wind on the craft at varying headings.)

The resolver CR5, resolves the sine and cosine components of the wind velocity signal, and these components are combined with sine and cosine components obtained from the "water servo" and fed to a further resolver R20.

The water servo signals are obtained in a manner similar to that already described for the wind velocity signals, i.e., the watervane sensor is coupled to synchro CX8. The resulting electrical signal is fed to the stator winding of synchro CDX9. The CDX9 shaft is controlled by a mechanical signal obtained from the position error signal sensing device C9, amplifier SA11 and servo S12. The resulting output of the CDX9 rotor winding is then passed to synchro CT13. The ouput of ST13 is amplified at SA14 and fed to motor M15. Motor M15 positions the shaft of resolver R16 and also the water cam servo S17, the electrical output of which is also fed to R16. Resolver R16 therefore will resolve the sine and cosine components of the "water servo" and it is these components that are combined with those derived from CR5 and jointly fed to R20 where they are algebraicially added.

Output from the one rotor of R20 is amplified at SA21 and fed as a control signal to the geared servo motor M22. The motor mechanically controls the rotor of R20 to position it in accordance with the signal derived from its own rotor winding, i.e., the vector sum of sine and cosine components of wind and water until this figure reaches a nul. At the same time, scalar heading error signal is passed to bow thruster control 23 so that ships heading is positioned in accordance with the requirements of resolver R20, i.e. for $\angle 8$ to be reduced to zero. The output of the second rotor of resolver R20 is directly coupled to control 24 to control the pitch of ships propeller and therefore the fore and aft movement of the vessel in the water.

Various modifications may be made within the scope of the invention.

Thus overriding manual control of the positioning system could be provided by a steering wheel controlling rudders at bow and stern and an arm detent invoking the bow thruster after a prescribed movement of the wheel.

I claim as my invention:

1. A vessel having screw propulsion means, such as a bow thruster, for turning the vessel when at rest or moving at low speed, and an arrangement for controlling its position, in relation to a reference point of the vessel, comprising trap doors disposed on said vessel to define the "turning point" of the vessel, means for orienting the vessel to direct it, after due allowance for tide and wind, towards the reference position, and means for controlling the propulsion of the vessel to drive it in the direction in which it is directed, towards the reference position.

2. A vessel as claimed in claim 1 and including a drilling rig mounted on a turntable platform disposed on the vessel.

3. A vessel as claimed in claim 1 and in addition a wind speed senser, a wind direction senser, a sea current speed senser, a sea current direction senser, means for deriving electrical outputs from each of the sensers and means for electrically resolving the combined electric outputs into a single algebraic force and direction output.

4. A vessel as claimed in claim 3 and in addition means representing the vessel's resistance at varying headings and means for deriving therefrom an output from the single algebraic force and direction output which when combined with the components of the ship's displacement from the reference point gives a selected heading to direct the vessel towards the reference point.

References Cited

UNITED STATES PATENTS

| | | | |
|---|---|---|---|
| 3,002,486 | 10/1961 | Jardmo | 114—151 XR |
| 3,078,680 | 2/1963 | Wepsala | 114—151 XR |
| 3,145,683 | 8/1964 | Kolb et al. | 114—144 |

ANDREW H. FARRELL, *Primary Examiner.*